(12) United States Patent
Grover et al.

(10) Patent No.: US 9,044,704 B2
(45) Date of Patent: Jun. 2, 2015

(54) USE OF OXYGEN FROM ION TRANSPORT MEMBRANES IN BLAST FURNACE

(75) Inventors: Bhadra S. Grover, Sugar Land, TX (US); Kenneth Kaiser, Bear, DE (US); Michael Garry Keith Grant, Versailles (FR); Wei Huang, Newark, DE (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 271 days.

(21) Appl. No.: 13/529,835

(22) Filed: Jun. 21, 2012

(65) Prior Publication Data

US 2013/0341839 A1  Dec. 26, 2013

(51) Int. Cl.
| | |
|---|---|
| *C21B 7/00* | (2006.01) |
| *B01D 53/22* | (2006.01) |
| *C01B 13/02* | (2006.01) |
| *C21B 5/00* | (2006.01) |
| *C21B 9/00* | (2006.01) |

(52) U.S. Cl.
CPC ............ *B01D 53/22* (2013.01); *C01B 13/0255* (2013.01); *C21B 5/00* (2013.01); *C21B 9/00* (2013.01); *B01D 2256/12* (2013.01)

(58) Field of Classification Search
CPC ............... B01D 53/22; B01D 2256/12; C01B 13/0255; C21B 9/00; C21B 5/00
USPC ................ 266/44, 138–141, 16, 197; 432/29; 75/392, 505, 958, 466, 458, 459, 660
See application file for complete search history.

(56) References Cited

U.S. PATENT DOCUMENTS

| | | |
|---|---|---|
| 5,244,489 A | 9/1993 | Grenier |
| 5,562,754 A | 10/1996 | Kang et al. |

(Continued)

FOREIGN PATENT DOCUMENTS

| | | | |
|---|---|---|---|
| EP | 0663230 | 7/1995 | |
| EP | 0888805 | * 1/1999 | ............ B01D 53/32 |
| JP | 2002213883 | 7/2002 | |

OTHER PUBLICATIONS

PCT/US2013/047062, International Search Report and Written Opinion, Dec. 5, 2013 (13 pages).

*Primary Examiner* — Scott Kastler
*Assistant Examiner* — Michael Aboagye
(74) *Attorney, Agent, or Firm* — Elwood L. Haynes; Justin K. Murray

(57) ABSTRACT

The present invention is a method of integrating oxygen production with blast furnace operation. A heated air stream is introduced to an ion transfer membrane separator, producing a permeate and a retentate. The permeate and the motive stream are introduced into an ejector jet pump producing an oxygen enriched stream. The oxygen enriched stream is introduced into blast furnace. In another embodiment of the present invention, the permeate and a steam motive stream are introduced into an ejector jet pump. Heated air inlet stream is introduced into a cascading series of ion transfer membrane separators, producing a series of permeate streams and a series of retentate streams wherein each retentate stream acts as the input stream for the subsequent ion transfer membrane separator. Thereby producing a series of oxygen enriched streams which are combined and introduced into blast furnace.

14 Claims, 2 Drawing Sheets

(56) References Cited

U.S. PATENT DOCUMENTS

| | | |
|---|---|---|
| 5,753,007 A | 5/1998 | Russek et al. |
| 6,149,714 A * | 11/2000 | Kobayashi .................. 95/54 |
| 2008/0050689 A1 * | 2/2008 | Hendriks et al. ............ 432/76 |

* cited by examiner

USE OF OXYGEN FROM ION TRANSPORT MEMBRANES IN BLAST FURNACE

BACKGROUND

The blast furnace is a tall shaft-type furnace with a vertical stack superimposed over a crucible-like hearth. Iron-bearing materials (iron ore, sinter, pellets, mill scale, steelmaking slag, scrap, etc.), coke and flux (limestone and dolomite) are charged into the top of the shaft. A blast of heated air and also, in most instances, a gaseous, liquid or powdered fuel are introduced through openings at the bottom of the shaft just above the hearth crucible. The heated air burns the injected fuel and much of the coke charged in from the top to produce the heat required by the process and to provide reducing gas that removes oxygen from the ore. The reduced iron melts and runs down to the bottom of the hearth. The flux combines with the impurities in the ore to produce a slag which also melts and accumulates on top of the liquid iron in the hearth. The iron and slag are drained out of the furnace through tapholes.

The top pressure that is controlled by the top gas handling equipment can be as high as (40-50 psig) for very large furnaces, and the blast air has been enriched with oxygen as high as 40% total oxygen in the blast. Pressure at the inlet of the tuyeres depends on the controlled top pressure and the quality of the raw materials, but can be as high as 60 psig for a very large blast furnace. Oxygen enrichment reduces the amount of air needed per tonne of iron and therefore, the resulting quantities of BF Top Gas are reduced.

Ion transport membranes (ITMs) consist of ionic and mixed-conducting ceramic oxides that conduct oxygen ions at elevated temperatures of 1475-1650 F. Air is compressed to about 230 psia, heated to 1650 F, and fed to ITM. Hot oxygen permeates through the membranes. The permeate pressure has to be kept low to provide oxygen partial pressure driving force across the membrane. Typically, 50% to 80% oxygen recovery seems possible.

SUMMARY

The present invention is a method of integrating oxygen production with blast furnace operation. A compressed air stream is divided into a blast furnace air stream and an ITM air stream. The blast furnace air stream is combined with an oxygen enriched stream and the combined stream is introduced into a blast furnace stove. The combined gas is then wherein it is heated, thereby producing heated blast furnace air stream, which is divided into a hot heat exchanger stream and a bypass heated stream. The ITM air stream is introduced into a heat exchanger, wherein it exchanges heat with the bypass hot heat exchanger stream, thereby producing cooled heat exchanger stream and warmed ITM stream. Cooled heat exchanger stream is then recombined with bypass heated stream and introduced into blast furnace. Warmed ITM stream is split into a ITM inlet stream and a motive stream. The ITM inlet stream is introduced into an ion transfer membrane separator, thereby producing a permeate stream and a retentate stream. The permeate stream and a motive stream are introduced into an ejector jet pump thereby producing the oxygen enriched stream, which is introduced into blast furnace. Alternately, a steam stream may be used as the motive stream for the ejector pump.

A system utilizing a series of ejector jet pumps is provided. Heated air inlet stream is introduced into a cascading series of ion transfer membrane separators thereby producing a series of permeate streams and a series of retentate streams wherein each retentate stream acts as the input stream for the subsequent ion transfer membrane separator. The permeate streams are introduced into a series of ejector jet pumps the ejector jet pumps using motive streams as motive fluid, thereby producing a series of oxygen enriched streams which are combined to form a combined oxygen enriched stream, which is introduced into blast furnace.

DESCRIPTION OF PREFERRED EMBODIMENTS

Figure 1:
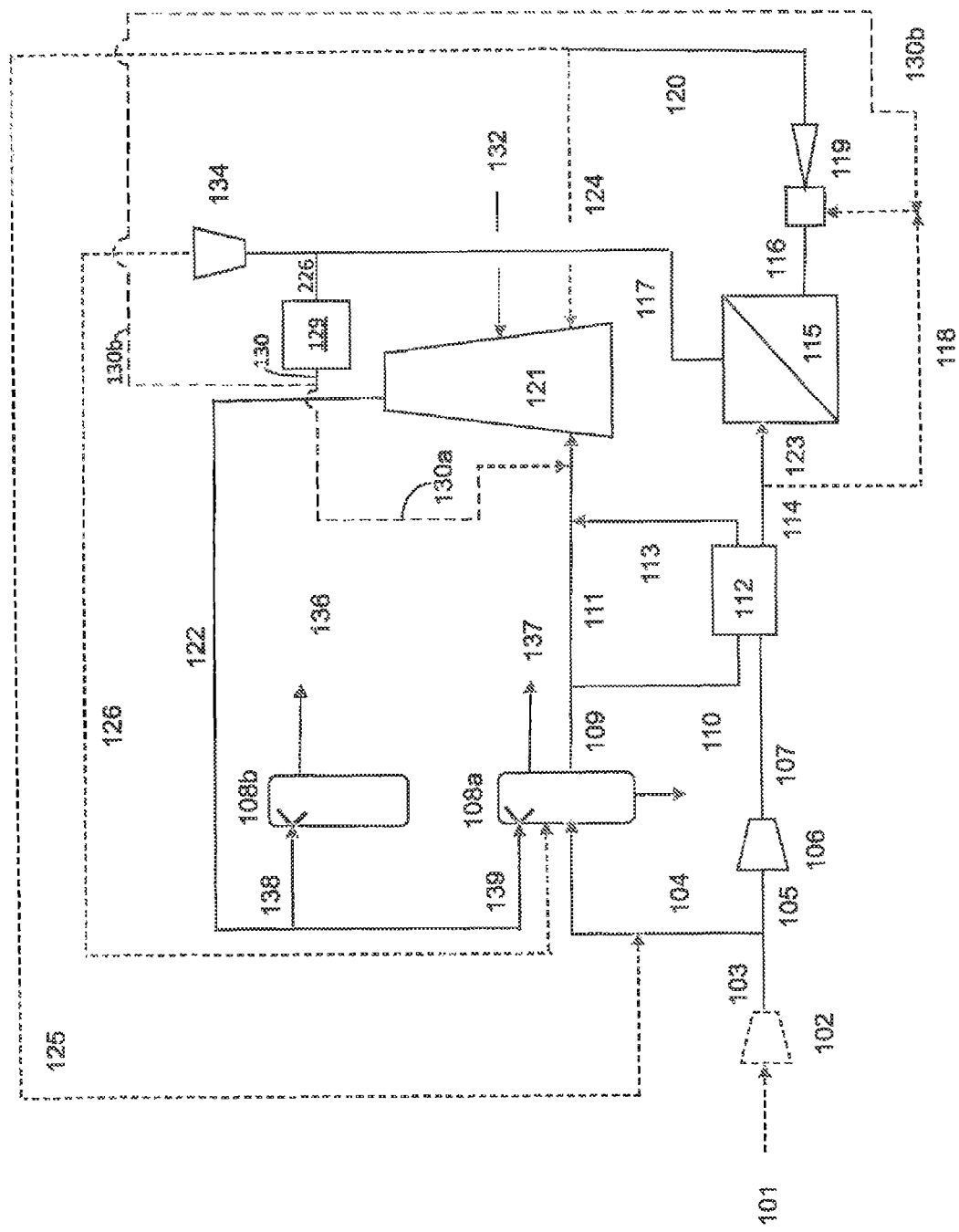
FIG. 1 is a schematic representation of one embodiment of the present invention.

Illustrative embodiments of the invention are described below. While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

To reduce the compression requirements for oxygen, a multi-stage membrane system is provided. The oxygen is withdrawn at successively reduced pressure.

In one, non-limiting example, oxygen may be withdrawn at 30, 16, 10, and 7 psia. The expected O2 recovery at these stages is 27%, 39%, 20% and 14% respectively. In this example, the desired pressure of hot oxygen is 60 psia. An ejector is provided at each stage. The ejector for first two stages is being driven by hot blast air compressed to 145-230 psia. The last two stages of the ejectors are being driven by 580 psia steam. The choice of motive force for the driver depends upon the amount of hot air blast and steam required for the blast furnace. The ejectors can also be arranged in series/parallel arrangement to optimize the amount of motive streams driving the ejectors. In this example ejector 3 & 4 feed into ejector-2.The pressure of hot air and steam can be optimized based on extent of oxygen compression required.

There are many possibilities of integrating ITM process with BF. The BF blast air compressor may be used as a source of air for the ITM. BF air compressor typically supplies air at 60-75 psia. A booster compressor will raise the air pressure for ITM to 230 psia.

The BF blast air can be used as motive force for thermocompression of hot O2 available at 7-30 psia. The O2 needs to be compressed to about 45-60 psia. The pressure desired for the motive air will be higher (in the range of 145-220 psia) than the typically pressure of 60-75 psia for the blast air.

Steam normally fed to BF can also be used as motive force for O2 compression. Hot residue gas from ITM can be let down in a turbo-expander and mixed with BF top gas, before the top gas is combusted and sent to stoves for heat recovery. Oxygen present in the N2 rich stream gets utilized for combustion of the BF top gas.

Hot residue gas from ITM can be mixed with fuel, combusted to use O2 present, let down in a turbo-expander and fed to the stove at some intermediate point.

The hot residue gas, downstream of turbo-expander, can be used to generate steam. The steam produced is used for motive steam for the ejectors, as described above. Or the steam is directly fed to the BF.

Turning to FIG. 1, a method of integrating oxygen production with blast furnace operation is provided. A dried air stream 101 is compressed in compressor 102, thus creating a compressed, dried air stream 103. The compressed, dried air stream 103 is divided into a blast furnace air stream 104 and an ITM air stream 105. As used in this description, blast furnace stove 108a is the active stove, and 108b is the inactive stove. Compressed, dried air stream 103 may have a pressure of about 72 psia. The blast furnace air stream 104 is combined with oxygen enriched stream 125 and is introduced into blast furnace stove 108a, wherein it is heated, thereby producing heated blast furnace air stream 109. Blast furnace stove 108b is heated with at least a portion 138 of blast furnace gas stream 122 in preparation for the above requirement to heat the combined blast furnace air stream 104 and oxygen enriched stream 125 once it is time to change the active stove. First combustion product stream 136 is then exhausted from the stove. Once the stove change takes place, blast furnace stove 108a becomes the inactive stove, and at least a portion 139 of blast furnace gas stream 122 is used to preheat this stove. Second combustion product stream 137 is then exhausted from the stove.

Heated blast furnace air stream 109 may have a temperature of between 1800 and 2200 F. Heated blast furnace air stream 109 is then divided into a hot heat exchanger stream 110 and a bypass heated stream 111. The ITM air stream 105 may be compressed in compressor 106, thereby producing compressed ITM air stream 107. Compressed ITM air stream 107 may have a pressure of about 230 psia. Compressed ITM air stream 107, or ITM air stream 105, is introduced into a heat exchanger 112, wherein it exchanges heat with the hot heat exchanger stream 110, thereby producing cooled heat exchanger stream 113 and warmed ITM air stream 114. Cooled heat exchanger stream 113 is recombined with bypass heated stream 111 and introduced into the blast furnace 121.

The warmed stream ITM air stream 114 is split into an ITM inlet stream 123 and a motive stream 118. ITM inlet stream 123 may have a temperature of about 1475 to 1650 F. ITM inlet stream 123 is introduced to an ion transfer membrane separator 115, thereby producing a permeate stream 116 and a retentate stream 117. The retentate stream 117 may then pass through a pressure reduction turbine 134. After pressure reduction, at least a portion 126 of retentate stream 117 may be introduced into active stove 108a to provide additional heat. A blast furnace steam stream 130a may be introduced into blast furnace 121.

The permeate stream 116 and the motive stream 118 are introduced into an ejector jet pump 119 thereby producing an oxygen enriched stream 120. Oxygen enriched stream 120 may have a pressure of about 60 psia, and may have a temperature between 1475 and 1650 F. A portion 124 of oxygen enriched stream 120 may be introduced directly into blast furnace 121. Oxygen enriched stream 124 may be introduced separated through individual lances in the tuyeres (not shown). A portion 125 of oxygen enriched stream 120 may combined with blast furnace air stream 104, at the pressure required for the blast furnace, and then introduced into blast furnace stove 108a, wherein it is heated and combined with heated blast furnace air 109 prior to introduction into blast furnace 121.

Retentate stream 117 may be expanded in expander 134, thereby producing reduced pressure retentate stream 126. At least a portion 138 of reduced pressure retentate stream 126 may be introduced into active BF Stove 108a, as discussed above. Reduced pressure retentate stream 126 may also be used for other purposes, such as drying ground coal in the in the pulverized coal injection (PCI) plant. At least a portion 139 of blast furnace gas stream 122 is introduced into inactive BF stove 108b, as discussed above.

In one embodiment, the method can also include the steps of introducing at least a portion (226) of retentate stres.m (117) into a steam generator (129); thereby producing steam stream (130), and dividing steam stream (130) into blast furnace steam stream (130a), which can then be introduced into blast furnace (121), and said steam motive stream (130b).

Figure 2:
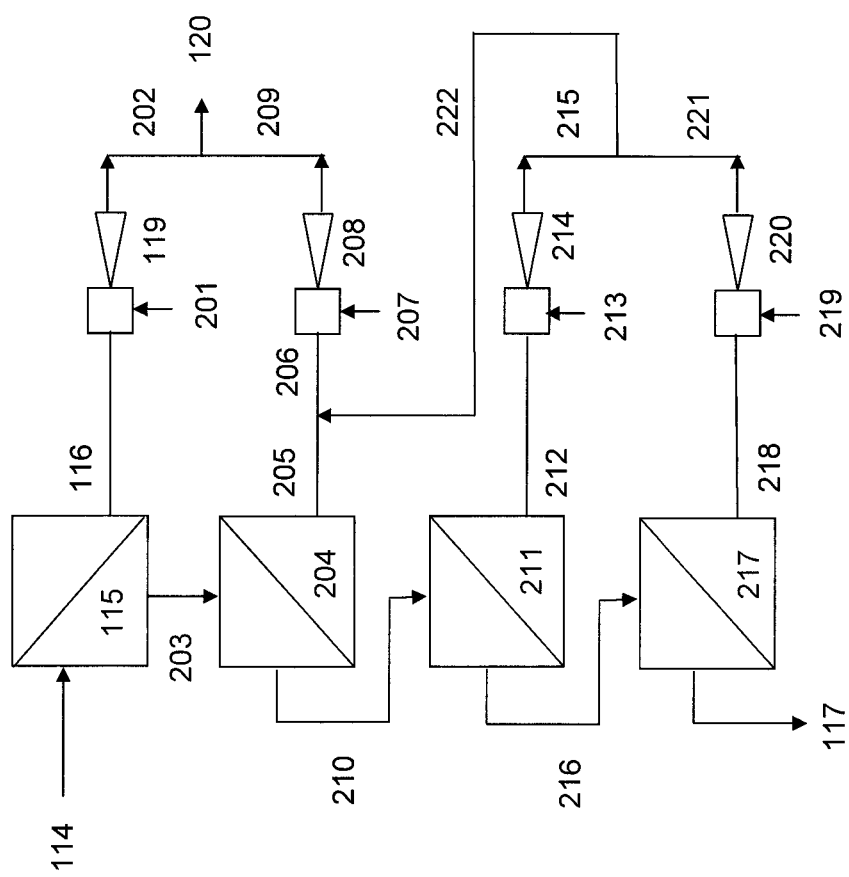
FIG. 2 is a schematic representation of one embodiment of the present invention.

Turning to FIG. 2, one non-limiting example of a system utilizing a series of ejector jet pumps. Heated air inlet stream 114 is introduced into a cascading series of ion transfer membrane separators 115, 204, 211, 217, thereby producing a series of permeate streams 116, 205, 212, 218 and a series of retentate streams 203, 210, 216, 117, wherein each retentate stream acts as the input stream for the subsequent ion transfer membrane separator. The permeate streams 116, 205, 212, 218 are introduced into a series of ejector jet pumps 119, 208, 214, 220, the ejector jet pumps using motive streams 201, 207, 213, 219 as motive fluid, thereby producing a series of oxygen enriched streams 202, 209, 215, 221, which are combined to form a combined oxygen enriched stream 120, which is introduced into blast furnace 121.

In a more detailed description of FIG. 2, heated air inlet stream 114 is introduced into a first ion transfer membrane separator 115, thereby producing a first permeate stream 116 and a first retentate stream 203. The first permeate stream 116 and a first motive stream 201 are introduced into a first ejector jet pump 119 thereby producing a first oxygen enriched stream 202. The first retentate stream 203 is introduced into a second ion transfer membrane separator 204, thereby producing a second permeate stream 205 and a second retentate stream 210. A second combined oxygen enriched stream 222 and the second permeate stream 205 are combined, thereby producing a third combined oxygen enriched stream 206.

The third combined oxygen enriched stream 206 and a second motive stream 207 are combined into a second ejector jet pump 208 thereby producing a second oxygen enriched stream 209. The second retentate stream 210 is introduced into a third ion transfer membrane separator 211, thereby producing a third permeate stream 212 and a third retentate stream 216. The third permeate stream 212 and a third motive stream 213 are introduced into a third ejector jet pump 214 thereby producing a third oxygen enriched stream 215. The third retentate stream 216 is introduced into a fourth ion transfer membrane separator 217, thereby producing a fourth permeate stream 218 and a fourth retentate stream 217.

The fourth permeate stream 218 and a fourth motive stream 219 are introduced into a fourth ejector jet pump 220 thereby producing a fourth oxygen enriched stream 221. The third oxygen enriched steam stream 215 and the fourth oxygen enriched stream 221 are combined thereby producing the second combined oxygen enriched stream 222. The first oxygen enriched stream 202 and the second oxygen enriched stream 209 are combined thereby producing a first combined oxygen enriched stream 120, which is introduced into blast furnace 121.

At least one of the motive streams may be steam. At least one of the motive streams may be heated air, and at least one additional motive stream may be steam.

What is claimed is:

1. A method of integrating oxygen production with blast furnace operation, comprising;
   a) dividing a compressed air stream (103) into a blast furnace air stream (104) and an ITM air stream (105);
   b) combining the blast furnace air stream (104) with an oxygen enriched stream (125) and introducing the combined stream into a first blast furnace stove (108a), wherein it is heated, thereby producing heated blast furnace air stream (109), which is divided into a hot heat exchanger stream (110) and a bypass heated stream (111);
   c) introducing at least a portion of a blast furnace gas stream (122) into a second blast furnace stove (108b), wherein it is used as fuel to heat the second blast furnace stove 108b;
   d) introducing the ITM air stream (105), into a heat exchanger (112), wherein it exchanges heat with the hot heat exchanger stream (110), thereby producing cooled heat exchanger stream (113) and warmed ITM stream (114), cooled heat exchanger stream (113) then being recombined with bypass heated stream (111) and introduced into blast furnace (121);
   e) splitting warmed ITM stream (114) into a ITM inlet stream (123) and a motive stream (118);
   f) introducing ITM inlet stream (123) to a cascading series of ion transfer membrane separators (115, 204, 211, 217), thereby producing a series of permeate streams (116, 205, 212, 218) and a series of retentate streams (203, 210, 216, 117), wherein each retentate stream acts as the input stream for the subsequent ion transfer membrane separator; and
   g) introducing the permeate stream (116, 205, 212, 218) into a series of ejector jet pumps (119, 208, 214, 220), the ejector jet pumps using motive stream (201, 207, 213, 219) as motive fluid, thereby producing a series of oxygen enriched streams (202, 209, 215, 221), which are combined to form a combined oxygen enriched stream (120), which is introduced into blast furnace (121).

2. The method of claim 1, wherein said compressed air stream (103) is provided by a blast air compressor (102).

3. The method of claim 1, wherein said ITM air stream (105) is further compressed (106) prior to introduction into said heat exchanger (112).

4. A method of integrating oxygen production with blast furnace operation, the method comprising the steps of:
   a) dividing a compressed air stream (103) into a blast furnace air stream (104) and an ITM air stream (105);
   b) combining the blast furnace air stream (104) with an oxygen enriched stream (125) and introducing the combined stream into a first blast furnace stove (108a), wherein it is heated, thereby producing heated blast furnace air stream (109), which is divided into a hot heat exchanger stream (110) and a bypass heated stream (111);
   c) introducing at least a portion of a blast furnace gas stream (122) into a second blast furnace stove (108b), wherein it is used as fuel to heat the second blast furnace stove 108b;
   d) introducing the ITM air stream (105), into a heat exchanger (112), wherein it exchanges heat with the hot heat exchanger stream (110), thereby producing cooled heat exchanger stream (113) and warmed ITM stream (114), cooled heat exchanger stream (113) then being recombined with bypass heated stream (111) and introduced into blast furnace (121);
   e) splitting warmed ITM stream (114) into a ITM inlet stream (123) and a motive stream (118);
   f) introducing the ITM inlet stream (123) to a first ion transfer membrane separator (115), thereby producing a first permeate stream (116) and a first retentate stream (203);
   g) introducing said first permeate stream (116) and a first motive stream (201) into a first ejector jet pump (119) thereby producing a first oxygen enriched stream (202);
   h) introducing said first retentate stream (203) to a second ion transfer membrane separator (204), thereby producing a second permeate stream (205) and a second retentate stream (210);
   i) combining a second combined oxygen enriched stream (222) and said second permeate stream (205) thereby producing a third combined oxygen enriched stream (206);
   j) introducing said third combined oxygen enriched stream (206) and a second motive stream (207) into a second ejector jet pump (208) thereby producing a second oxygen enriched stream (209);
   k) introducing said second retentate stream (210) to a third ion transfer membrane separator (211), thereby producing a third permeate stream (212) and a third retentate stream (216);
   l) introducing said third permeate stream (212) and a third motive stream (213) into a third ejector jet pump (214) thereby producing a third oxygen enriched stream (215);
   m) introducing said third retentate stream (216) to a fourth ion transfer membrane separator (217), thereby producing a fourth permeate stream (218) and a fourth retentate stream (117);
   n) introducing said fourth permeate stream (218) and a fourth motive stream (219) into a fourth ejector jet pump (220) thereby producing a fourth oxygen enriched stream (221);
   o) combining said third oxygen enriched steam stream (215) and said fourth oxygen enriched stream (221) thereby producing said second combined oxygen enriched stream (222); and
   p) combining said first oxygen enriched stream (202) and said second oxygen enriched stream (209) thereby producing a first combined oxygen enriched stream (120), which is introduced into blast furnace (121).

5. The method of claim 4, wherein at least one of said motive streams comprises steam.

6. The method of claim 4 wherein at least one of said motive streams comprises heated air, and at least one additional motive stream comprises steam.

7. A method of integrating oxygen production with blast furnace operation, the method comprising the steps of:
   a) dividing a heated air inlet stream (103) into a blast furnace air stream (104) and a ITM air stream (105);
   b) combining the blast furnace air stream (104) with an oxygen enriched stream (125) and introducing the combined stream into a blast furnace stove (108a), wherein it is heated, thereby producing heated blast furnace air stream (109), which is divided into a hot heat exchanger stream (110) and a bypass heated stream (111);
   c) introducing at least a portion of a blast furnace gas stream (122) into a second blast furnace stove (108b), wherein it is used as fuel to heat the second blast furnace stove (108b);
   d) introducing the ITM air stream (105), into a heat exchanger (112), wherein it exchanges heat with the hot heat exchanger stream (110), thereby producing cooled heat exchanger stream (113) and warmed ITM stream (114), cooled heat exchanger stream (113) then being recombined with bypass heated stream (111) and introduced into blast furnace (121);

e) introducing warmed ITM stream (114) to a cascading series of ion transfer membrane separators (115, 204, 211, 217), thereby producing a series of permeate streams (116, 205, 212, 218) and a series of retentate streams (203, 210, 216, 117), wherein each retentate stream acts as the input stream for the subsequent ion transfer membrane separator;

f) introducing the permeate stream (116, 205, 212, 218) into a series of ejector jet pumps (119, 208, 214, 220), the ejector jet pumps using motive stream (201, 207, 213, 219) as motive fluid, thereby producing a series of oxygen enriched streams (202, 209, 215, 221), which are combined to form a combined oxygen enriched stream (120), which is introduced into blast furnace (121);

g) introducing at least a portion (226) of retentate stream (117) into a steam generator (129); thereby producing steam stream (130); and h) dividing steam stream (130) into blast furnace steam stream (130a), which is introduced into blast furnace (121), and said steam motive stream (130b).

8. The method of claim 7, wherein said portion of retentate stream (117) passes through a pressure reduction turbine (133) prior to introduction into steam generator (129).

9. The method of claim 7, wherein said steam generator (129) is supplemental fired.

10. The method of claim 7 wherein said heated air inlet stream (103) is provided by a blast air compressor (102).

11. The method of claim 7 wherein said heated air inlet stream (103) is further compressed (106) prior to introduction into said heat exchanger (112).

12. A method of integrating oxygen production with blast furnace operation, the method comprising the steps of:

a) dividing a heated air inlet stream (103) into a blast furnace air stream (104) and a ITM air stream (105);

b) combining the blast furnace air stream (104) with an oxygen enriched stream (125) and introducing the combined stream into a blast furnace stove (108a), wherein it is heated, thereby producing heated blast furnace air stream (109), which is divided into a hot heat exchanger stream (110) and a bypass heated stream (111);

c) introducing at least a portion of a blast furnace gas stream (122) into a second blast furnace stove (108b), wherein it is used as fuel to heat the second blast furnace stove (108b);

d) introducing the ITM air stream (105), into a heat exchanger (112), wherein it exchanges heat with the hot heat exchanger stream (110), thereby producing cooled heat exchanger stream (113) and warmed ITM stream (114), cooled heat exchanger stream (113) then being recombined with bypass heated stream (111) and introduced into blast furnace (121);

e) introducing warmed ITM stream (114) to a first ion transfer membrane separator (115), thereby producing a first permeate stream (116) and a first retentate stream (203);

f) introducing said first permeate stream (116) and a first motive stream (201) into a first ejector jet pump (119) thereby producing a first oxygen enriched stream (202);

g) introducing said first retentate stream (2303) to a second ion transfer membrane separator (204), thereby producing a second permeate stream (205) and a second retentate stream (210);

h) combining a second combined oxygen enriched stream (222) and said second permeate stream (205) thereby producing a third combined oxygen enriched stream (206);

i) introducing said third combined oxygen enriched stream (206) and a second motive stream (207) into a second ejector jet pump (208) thereby producing a second oxygen enriched stream (209);

j) introducing said second retentate stream (210) to a third ion transfer membrane separator (211), thereby producing a third permeate stream (212) and a third retentate steam (216);

k) introducing said third permeate stream (212) and a third motive stream (213) into a third ejector jet pump (214) thereby producing a third oxygen enriched stream (2315);

l) introducing said third retentate stream (216) to a fourth ion transfer membrane separator (217), thereby producing a fourth permeate stream (218) and a fourth retentate stream (117);

m) introducing said fourth permeate stream (218) and a fourth motive stream (219) into a fourth ejector jet pump (220) thereby producing a fourth oxygen enriched stream (221);

n) combining said third oxygen enriched steam stream (215) and said fourth oxygen enriched stream (221) thereby producing said second combined oxygen enriched stream (222), and o) combining said first oxygen enriched stream (202) and said second oxygen enriched stream (209) thereby producing a first combined oxygen enriched stream (120), which is introduced into blast furnace (121);

p) introducing at least a portion (226) of fourth retentate stream (117) into a steam generator (129); thereby producing steam stream (130); and q) dividing steam stream (130) into blast furnace steam stream (130a), which is introduced into blast furnace (121), and said steam motive stream (130b).

13. The method of claim 12, wherein at least one of said motive streams comprises heated air.

14. The method of claim 12, wherein at least one of said motive streams comprises heated air, end at least one additional motive stream comprises steam.

* * * * *